United States Patent
Patel et al.

(10) Patent No.: US 10,297,152 B1
(45) Date of Patent: May 21, 2019

(54) DISPLAYING SENSOR DATA AND SUPPLEMENTAL DATA AS A MASK FOR AUTONOMOUS VEHICLES

(71) Applicant: Waymo LLC, Mountain View, CA (US)

(72) Inventors: Nirmal Patel, Sunnyvale, CA (US); Maria Moon, Mountain View, CA (US); Peter Crandall, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 15/854,165

(22) Filed: Dec. 26, 2017

Related U.S. Application Data

(60) Provisional application No. 62/578,114, filed on Oct. 27, 2017.

(51) Int. Cl.
　　*G01S 17/89*　　(2006.01)
　　*G08G 1/0967*　　(2006.01)
　　*G01S 17/93*　　(2006.01)

(52) U.S. Cl.
　　CPC ........ *G08G 1/096766* (2013.01); *G01S 17/89* (2013.01); *G01S 17/936* (2013.01)

(58) Field of Classification Search
　　CPC .............................................. G08G 1/096766
　　See application file for complete search history.

(56) References Cited

U.S. PATENT DOCUMENTS

| | | | |
|---|---|---|---|
| 6,442,484 B1* | 8/2002 | Miller | B60R 21/0134 340/990 |
| 2006/0125679 A1* | 6/2006 | Horibe | G01S 17/023 342/52 |
| 2011/0102234 A1* | 5/2011 | Adams | G01S 13/888 342/22 |
| 2013/0314274 A1* | 11/2013 | Nakagawa | G01S 7/354 342/90 |

(Continued)

OTHER PUBLICATIONS

Luo, Zhongzhen, "Lidar Based Perception System Pioneer Technology for Safety Driving" (2017) 234 pgs.

(Continued)

*Primary Examiner* — Joseph H Feild
*Assistant Examiner* — Pameshanand Mahase
(74) *Attorney, Agent, or Firm* — Botos Churchill IP Law

(57) ABSTRACT

Aspects of the disclosure relate to providing sensor data on a display of a vehicle. For instance, data points generated by a lidar sensor may be received. The data points may be representative of one or more objects in an external environment of the vehicle. A scene including a representation of the vehicle from a perspective of a virtual camera, a first virtual object corresponding to at least one of the one or more objects, and a second virtual object corresponding to at least one object identified from pre-stored map information may be generated. Supplemental points corresponding to a surface of the at least one object identified from the pre-stored map information may be generated. A pulse including at least some of the data points generated by the sensor and the supplemental points may be generated. The scene may be displayed with the pulse on the display.

16 Claims, 20 Drawing Sheets

(56) References Cited

U.S. PATENT DOCUMENTS

2016/0140400 A1* 5/2016 Chandraker ....... G06K 9/00785
 348/149
2017/0212517 A1 7/2017 Houle et al.
2018/0089899 A1* 3/2018 Piemonte ............. G01C 21/365

OTHER PUBLICATIONS

Shim, Inwook, et al., "An Autonomous Driving System for Unknown Environments Using a Unified Map" (2015) 15 pgs.

* cited by examiner

DISPLAYING SENSOR DATA AND SUPPLEMENTAL DATA AS A MASK FOR AUTONOMOUS VEHICLES

CROSS-REFERENCES TO RELATED APPLICATIONS

The present application claims the benefit of the filing date of U.S. Provisional Application No. 62/578,114, filed Oct. 27, 2017, the disclosure of which is hereby incorporated herein by reference.

BACKGROUND

Autonomous vehicles, such as vehicles that do not require a human driver, can be used to aid in the transport of passengers or items from one location to another. Such vehicles may operate in a fully autonomous mode where passengers or a remote operator may provide some initial input, such as a pickup or destination location, and the vehicle maneuvers itself to that location.

Such vehicles are typically equipped with various types of sensors in order to detect objects in the surroundings. For example, autonomous vehicles may include lasers, sonar, radar, cameras, and other devices which scan and record data from the vehicle's surroundings. Sensor data from one or more of these devices may be used to detect objects and their respective characteristics (position, shape, heading, speed, etc.). These characteristics can be used to provide, to occupants of the vehicle, a visual indication of objects detected in the vicinity of a vehicle as well as what those objects are likely to do for some brief period into the future.

To provide occupants of the vehicle with information about the vehicle's environment, a display in the vehicle may present a video generated by a video display system from the perspective of a virtual camera fixed relative to the vehicle at a default position. The video may include imagery within a set field of view corresponding to the position of the virtual camera including a portion of the vehicle's surroundings and the vehicle's projected trajectory.

BRIEF SUMMARY

One aspect of the disclosure provides a method of providing sensor data on a display of a vehicle. The method includes receiving, by the one or more processors, data points generated by a lidar sensor representative of one or more objects in an external environment of the vehicle; generating, by the one or more processors, a scene including a representation of the vehicle from a perspective of a virtual camera, a first virtual object corresponding to at least one of the one or more objects, and a second virtual object corresponding to at least one object identified from pre-stored map information; generating, by the one or more processors, supplemental points corresponding to a surface of the at least one object identified from the pre-stored map information; generating, by the one or more processors, a mask including at least some of the data points generated by the sensor and the supplemental points; and displaying, by the one or more processors, the scene with the mask on the display.

In some examples the simulated points are not points corresponding to actual sensor data provided by a perception system of the vehicle including the lidar sensor. In certain examples generating the mask includes generating a plurality of rings. In some instances displaying the mask includes highlighting the plurality of supplemental points once a ring of the plurality of rings contacts a surface of the second virtual object. In certain instances the plurality of rings are concentric about the vehicle from a top-down perspective. In some examples wherein displaying the mask includes displaying the plurality of rings such that the rings appear to emanate from the vehicle. In some examples, displaying the mask includes displaying portions of the plurality of rings only when such portions contact the first virtual object. In certain instances, wherein displaying the video includes fading the plurality of rings away over a period of time. Generating the supplemental points may include generating one or more lines for a surface of the second virtual object. In some examples, generating the supplemental points includes identifying intersection points of two or more sets of perpendicular lines overlaid on a surface of the second virtual object. In some examples, generating the supplemental points includes identifying points of a grid overlaid on a surface of the second virtual object.

In some examples, the first virtual object is a road user. In certain examples, the at least one object is a building. In some examples, the at least one object is a lane marker.

Another aspect of the disclosure provides a system of providing sensor data on a display of a vehicle, the system comprising one or more processors. The one or more processors are configured to receive data points generated by a lidar sensor representative of one or more objects in an external environment of the vehicle; generate a scene including a representation of the vehicle from a perspective of a virtual camera, a first virtual object corresponding to at least one of the one or more objects, and a second virtual object corresponding to at least one object identified from pre-stored map information; generate supplemental points corresponding to a surface of the at least one object identified from the pre-stored map information; generate a mask including at least some of the data points generated by the sensor and the supplemental points; and display the scene with the mask on the display.

In some examples, the simulated points are not points corresponding to actual sensor data provided by a perception system of the vehicle, including the lidar sensor. In some examples, generating the mask includes generating a plurality of rings. In some instances displaying the mask includes highlighting the plurality of supplemental points once a ring of the plurality of rings contacts a surface of the second virtual object.

In some instances, the system further comprises the vehicle.

DETAILED DESCRIPTION

Overview

Figure 1:
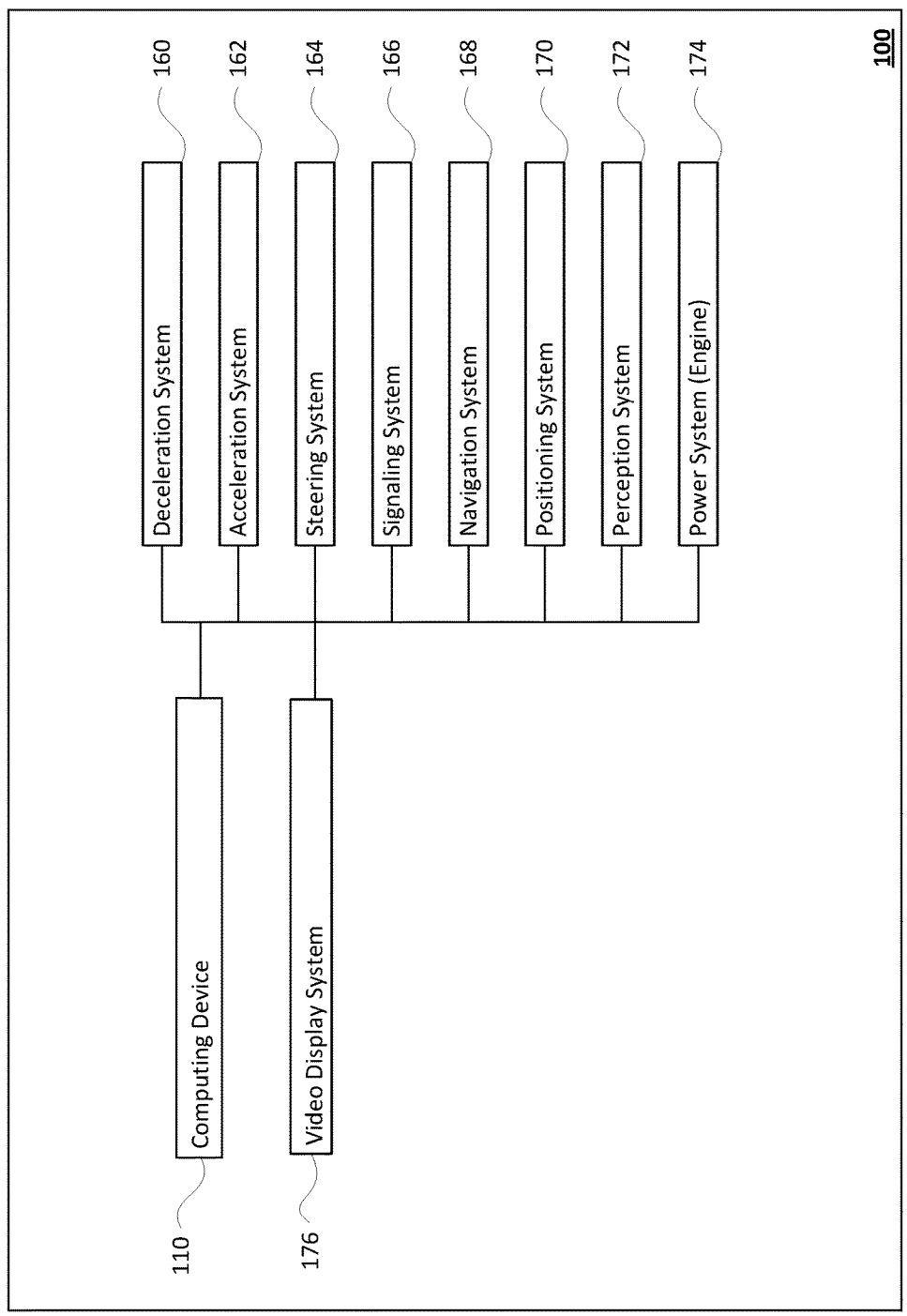
FIG. 1 is a functional diagram of an example vehicle in accordance with an exemplary embodiment.

Vehicles operating in autonomous driving modes typically function with little to no passenger input. Because of this, a passenger would typically not have any understanding of a vehicle's location, the vehicle's surroundings, why the vehicle took a particular action, or what the vehicle plans to do at some point in the future. This can cause anxiety or stress for the passenger. To reduce or avoid such discomfort, the vehicle's computing devices may generate and display an animation or video of imagery surrounding the vehicle. This video may be generated and displayed to a passenger in real time so as to provide the passenger with useful and up to date information about the vehicle and its environment. However, including too much imagery may be overwhelming to the passenger. On the other hand, providing too little imagery may aggravate the passenger's discomfort, as the passenger may not believe the vehicle is aware of its surroundings. To address this, imagery included in the video may be selectively displayed and, in certain instances, augmented or supplemented.

A computing device of a video display system within the vehicle may generate the video based on data received from the vehicle's other computing systems. In this regard, the computing device may receive data from the vehicle's navigation system, positioning system, and perception system. For instance, data received by the computing device from the positioning and navigation system may include a vehicle's projected trajectory, such as upcoming turns and lane changes, as well as map data, and data received from the perception system may include data indicating objects, such as other vehicles, trees, pedestrians, etc., within the vicinity of the vehicle. The computing device may pass this data to the video display system. In some instances, the video display system may receive the data directly.

The video display system may generate the video from a perspective of a virtual camera using the received data. In this regard, the video may include imagery within a set field of view corresponding to the position of a virtual camera including a portion of the vehicle's surroundings and the vehicle's projected trajectory. The video display system may update the video in substantially real-time by continually updating the vehicle's projected trajectory and position of detected objects on the map based on received data.

The video display system may generate the video by overlaying a virtual representation of the vehicle and the vehicle's projected trajectory on a 3D scene of the vehicle's environment. The video may also include virtual objects representative of objects stored within map data, such as roads, road lines, and buildings, provided by the navigation or positioning systems.

Objects identified by the perception system may be represented as virtual objects overlaid on the 3D scene. In this regard, the video display system may generate virtual objects which correspond to the data indicating objects provided by the perception system. These virtual objects may then be overlaid on the video relative to the position of the virtual vehicle The virtual objects may be selectively displayed in the 3D scene. As previously discussed, passengers may be overwhelmed when too much information is presented on the display. As such, the video display system may select only a subset of objects from which to generate and continually display corresponding virtual objects. The subset of objects for which virtual objects may be generated and displayed may be based upon the types of objects which the virtual objects represent.

Upon an object no longer being in the vicinity of the vehicle, its corresponding virtual object may no longer be displayed. In this regard, the video display system may move the virtual object off of the 3D scene or cease generating the virtual object.

In some instances, the video display system may highlight virtual objects. In this regard, virtual objects which represent objects of interest, such as pedestrians, may be highlighted with a solid or flashing base, or other such visual element which brings attention to the virtual object.

As previously discussed, providing too little imagery of the vehicle's surroundings may cause the passengers discomfort, as they may not believe the vehicle is aware of all of its surroundings. To address this, the video display system may emulate the operation of a sensor in the perception system, such as a LIDAR, to provide additional details of the vehicle's surroundings on the display. Emulation of the sensor may include generating a mask on the display which illuminates sensor points associated with some or all of the objects identified by the perception system. The mask may be an animation which gives the passenger the impression that a sensor, such as a LIDAR sensor, is capturing data.

The video display system may generate and display supplemental points for the virtual objects corresponding to objects stored within map data. In this regard, during a mask, the video display system may generate supplemental points which may be overlaid onto one or more surfaces of virtual objects corresponding to objects stored within map data, thereby creating the illusion that a sensor, such as the LIDAR, is capturing data related to the objects stored in the map data.

The features described above, may allow computing devices of vehicles, such as autonomous vehicles, to provide passengers with a display showing virtual representations of the vehicle's surroundings in a visually pleasing manner. This information may be generated and displayed in real time in order to provide the most useful presentation of data to a passenger. In addition, by continually providing only a subset of the objects in the vehicle's surroundings as virtual objects, the passenger is not overwhelmed by too much information. Additionally, by occasionally providing a more complete picture of the vehicle's surroundings as virtual representations virtual objects a passenger may be provided reassurance that the vehicle is completely aware of its surroundings.

Example Systems

Figure 2:
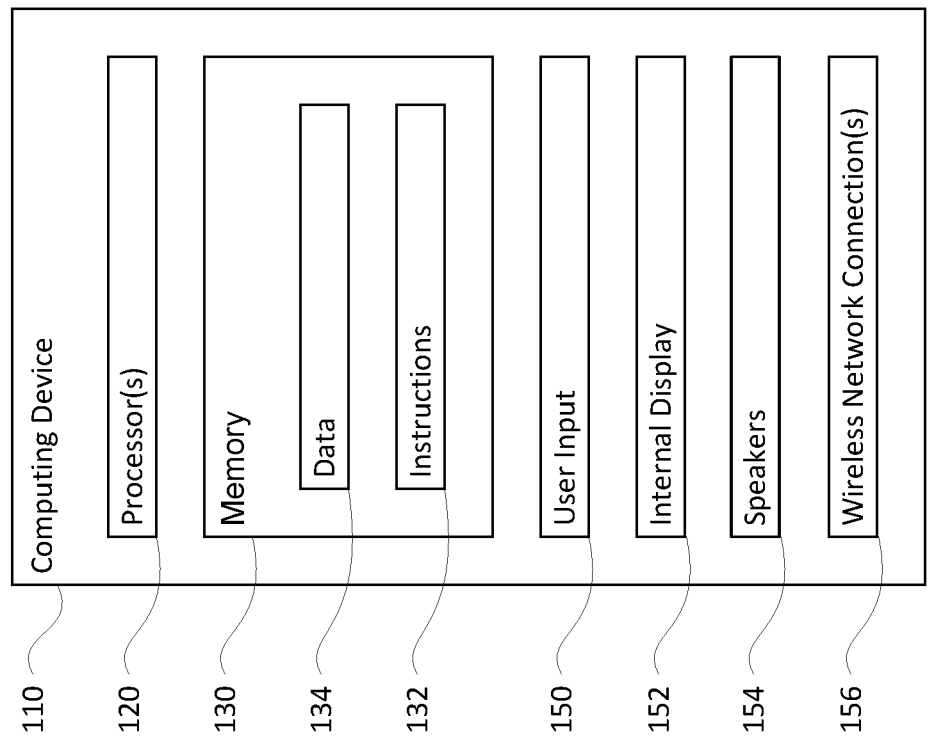
FIG. 2 is a functional diagram of an example system in accordance with an exemplary embodiment.

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices, as shown in FIG. 2.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information), as shown in FIG. 2. In this example, the vehicle includes an internal display 152 as well as one or more speakers 154 to provide information or audio visual experiences. In this regard, internal display 152 may be located within a cabin of vehicle 100 and may be used by computing device 110 to provide information to passengers within the vehicle 100.

Computing device 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may be capable of communicating with various components of the vehicle. For example, returning to FIG. 1, computing device 110 may be in communication with various systems of vehicle 100, such as deceleration system 160, acceleration system 162, steering system 164, signaling system 166, navigation system 168, positioning system 170, perception system 172, and video display system 176 in order to control the movement, acceleration, speed, operation, etc. of vehicle 100 in accordance with the instructions 132 of memory 130. Again, although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed and acceleration of the vehicle. For example, the acceleration system 162 may provide signals to the engine 174 to accelerate at a particular rate. Similarly, steering system 164 may be used by computing device 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways Positioning system 170 may be used by computing device 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a small passenger vehicle such as a car, the car may include a laser or other sensors mounted on the roof or other convenient location. For instance, a vehicle's perception system may use various sensors, such as LIDAR, sonar, radar, cameras, etc. to detect objects and their characteristics such as location, orientation, size, shape, type, direction and speed of movement, etc. The raw data from the sensors and/or the aforementioned characteristics can be quantified or arranged into a descriptive function or vector for processing by the computing device 110. As discussed in further detail below, computing device 110 may use the positioning system 170 to determine the vehicle's location and perception system 172 to detect and respond to objects when needed to reach the location safely.

The video display system 176 may monitor data from the systems of the vehicle to generate a video of the vehicle's surroundings for display in the vehicle. In this regard, the video display system 176 may monitor system data generated by the other computing devices regarding the vehicle's operation including data representing the vehicle's past, present, and future operation. The vehicle display system may also monitor messages sent to and from the vehicle's computing device 110, which is in communication with the different systems and computing devices of the vehicle. For instance, the video display system may aggregate data from the vehicle's perception system 172, such as objects external to the vehicle within a particular range, data from the positioning system 170, such as the vehicle's current location, and data from the navigation system 168, such as the vehicle's projected trajectory and map information, as described above.

The video display system may take the monitored data and messages and generate a video of the vehicle's surroundings and the vehicle's projected trajectory. In this regard, the video may include imagery within a set field of view corresponding to the position of a virtual camera including a portion of the vehicle's surroundings and the vehicle's projected trajectory. In this regard, the video display system 176 may overlay the vehicle's projected trajectory and detected objects on a map corresponding to the route the vehicle is traveling. The video generated by the video display system 176 may be presented to the vehicle's passengers, other individuals, or recorded for future viewing, such as on a display in the vehicle.

The video display system may include some or all of the components of the computing device 110 as described herein, such as processor 120, memory 130, data 134, instructions 132, and wireless network connections 156. Likewise, in addition to, or alternatively to the functions of the video display system described herein, the video display system may perform the functions of a computing device 110. In this regard, the video display system may communicate with the various systems of the vehicle, such as systems 160-174.

FIGS. 3A-3D are example, external views of a first configuration for vehicle 100. As can be seen in these figures, vehicle 100 includes many features of a typical vehicle such as headlights 302, windshield 303, taillights/turn signal lights 304, rear windshield 305, doors 306, side view mirrors 308, tires and wheels 310, and turn signal/parking lights 312. Headlights 302, taillights/turn signal lights 304, and turn signal/parking lights 312 may be associated the signaling system 166. Light bar 307 may also be associated with the signaling system 166.

Vehicle 100 also includes sensors of the perception system 172. For example, housing 314 may include one or more laser devices for having 360 degree or narrower fields of view and one or more camera devices. Housings 316 and 318 may include, for example, one or more radar and/or sonar devices. The devices of the perception system may also be incorporated into the typical vehicle components, such as taillights/turn signal lights 304 and/or side view mirrors 308. Each of these radar, camera, and lasers devices may be associated with processing components which process data from these devices as part of the perception system 172 and provide sensor data to the computing device 110.

Figure 3A:
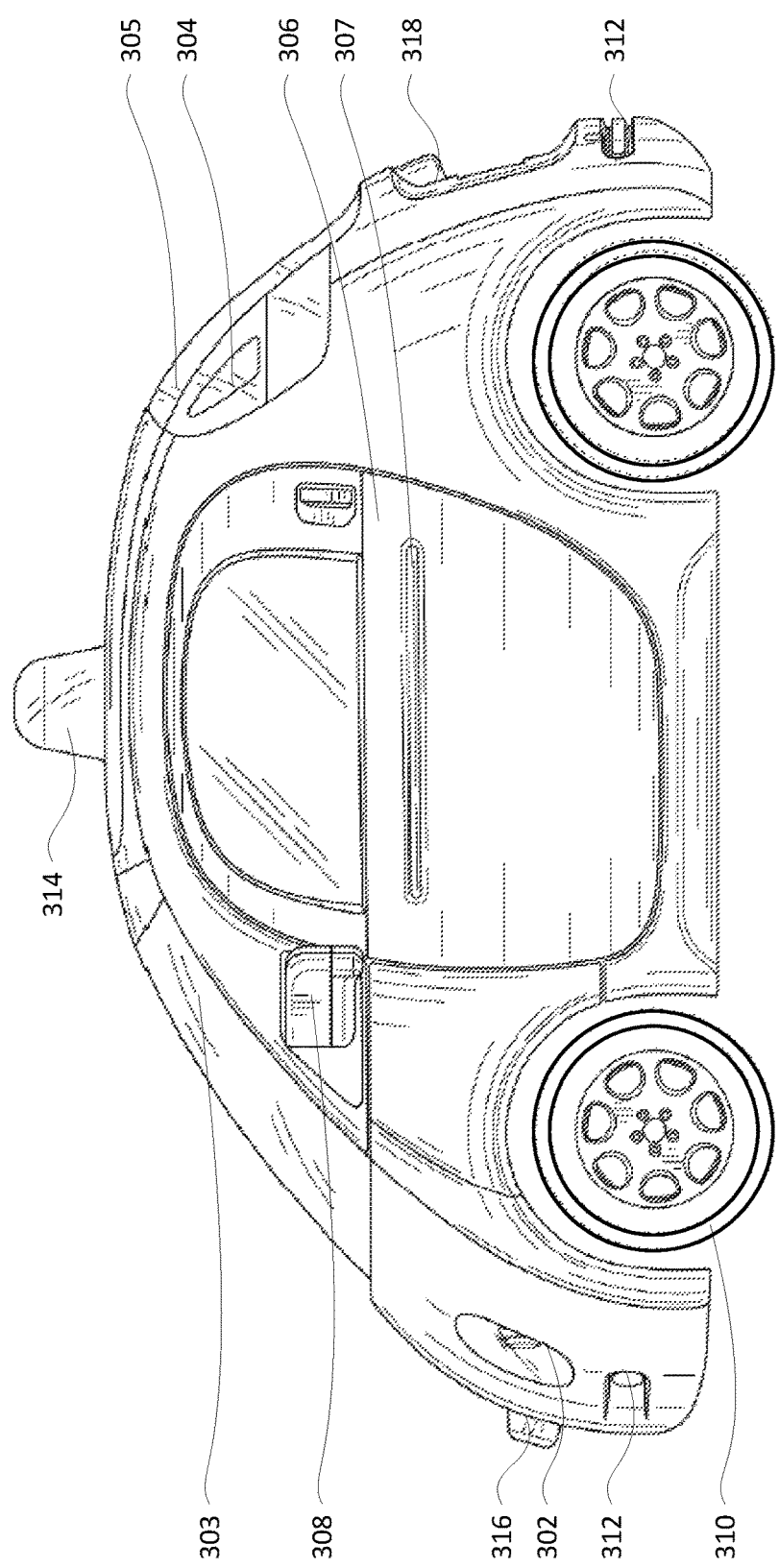
FIGS. 3A-3D are example external views of a vehicle in accordance with aspects of the disclosure.
Figure 3C:
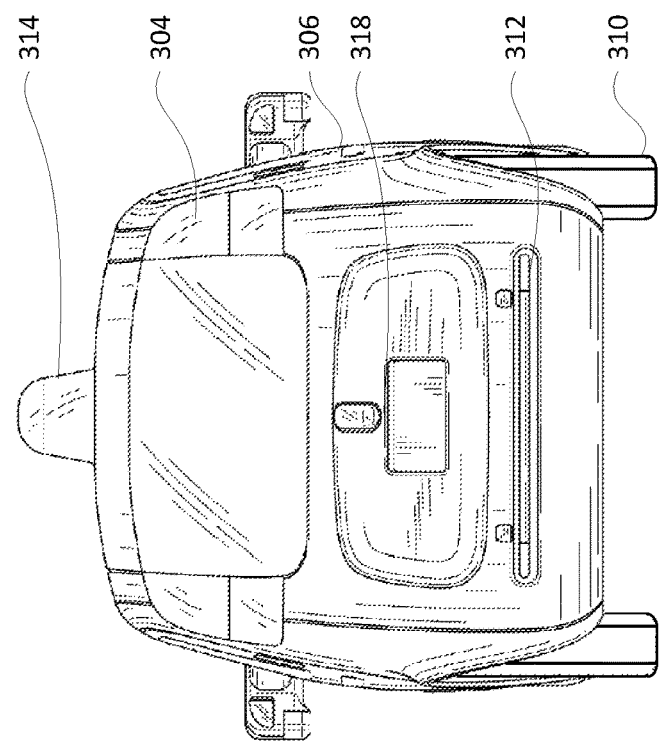
Figure 3B:
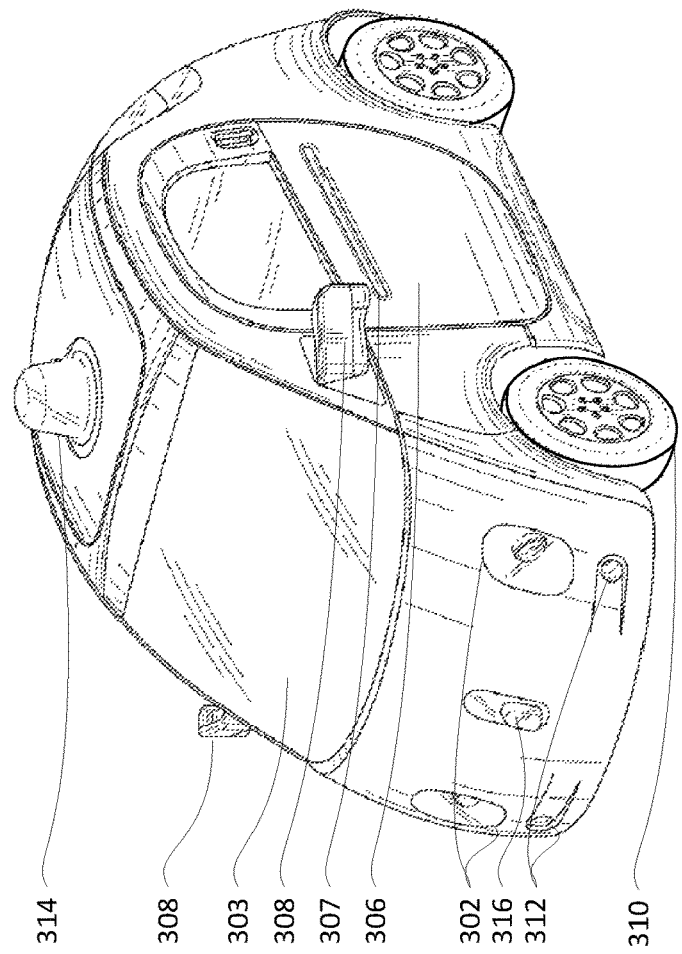
Figure 3D:
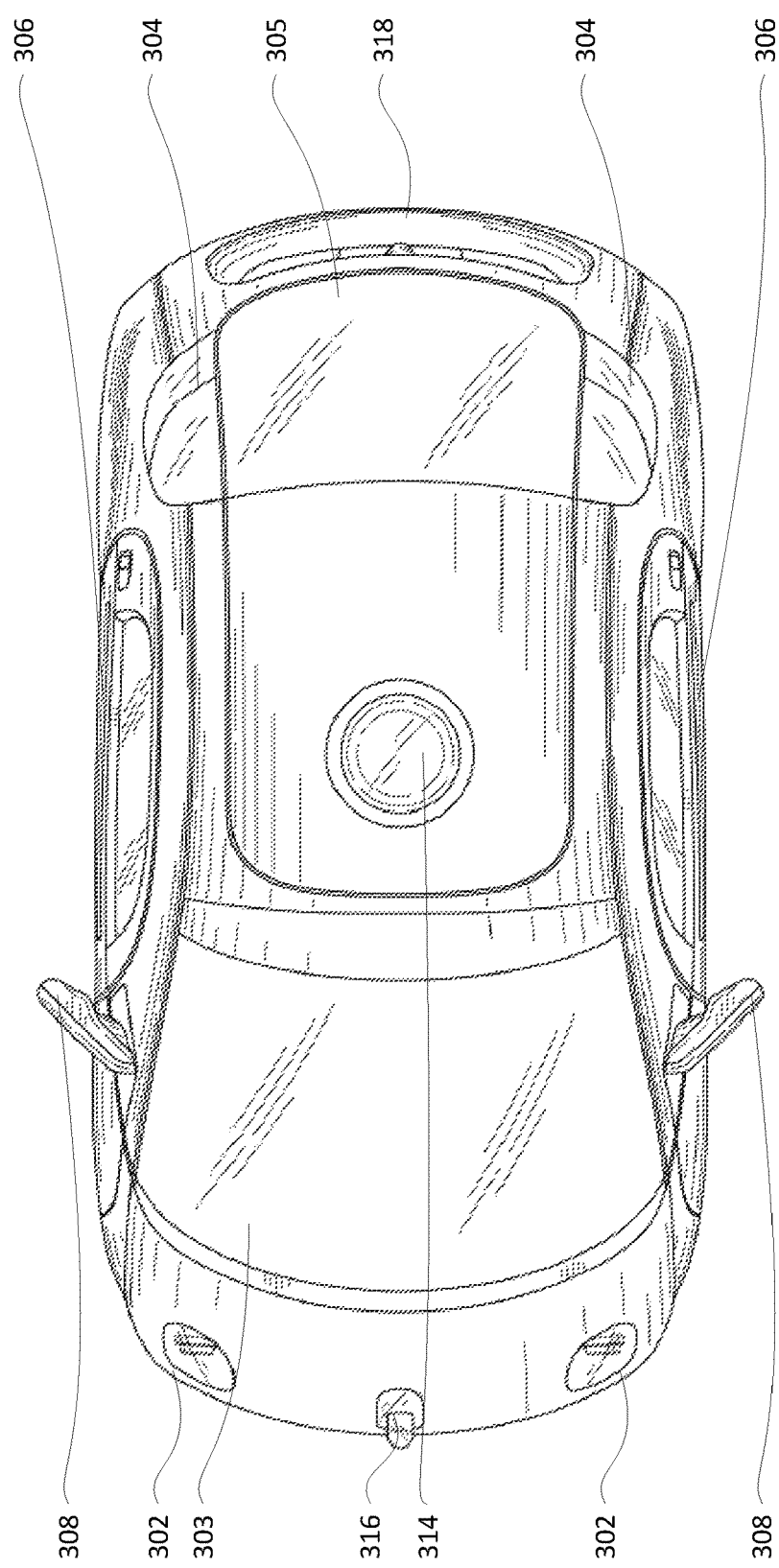
Figure 3E:
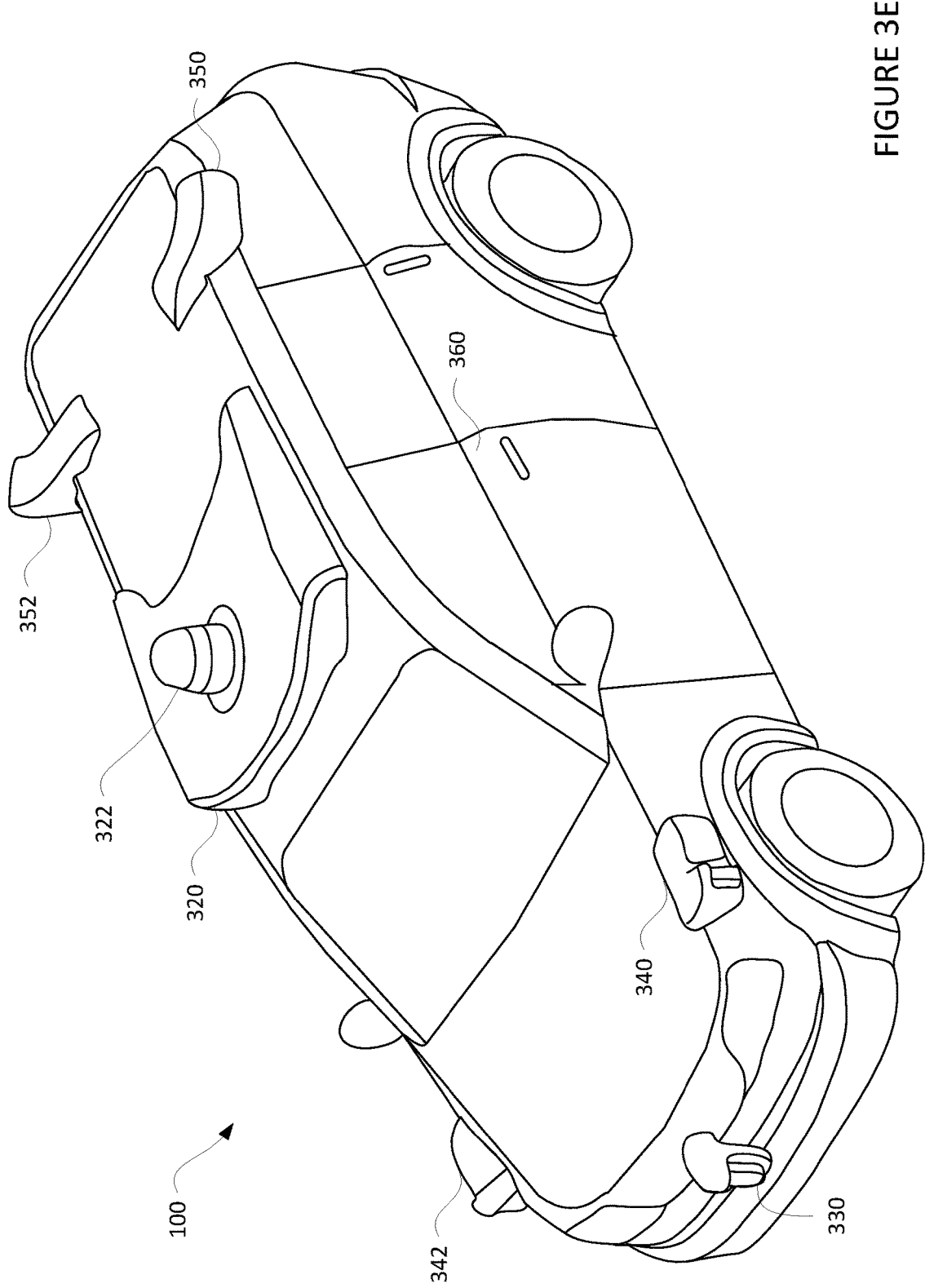
FIG. 3E is an example external view of a vehicle in accordance with aspects of the disclosure.

FIG. 3E is a second example configuration for vehicle 100. In this example, roof-top housing 320 and dome housing 322 may include a lidar sensor as well as various cameras and radar units. In addition, housing 330 located at the front end of vehicle 100 and housings 340, 342 on the driver's and passenger's sides of the vehicle may each store a lidar sensor. For example, housing 340 is located in front of driver door 360. Vehicle 100 also includes housings 350, 352 for radar units and/or cameras also located on the roof of vehicle 100. Additional radar units and cameras (not shown) may be located at the front and rear ends of vehicle 100 and/or on other positions along the roof or roof-top housing 320.

The one or more computing devices 110 of vehicle 100 may also receive or transfer information to and from other computing devices, for instance using wireless network connections 156. The wireless network connections may include, for instance, BLUETOOTH®, Bluetooth LE, LTE, cellular, near field communications, etc. and various combinations of the foregoing.

Figure 4:
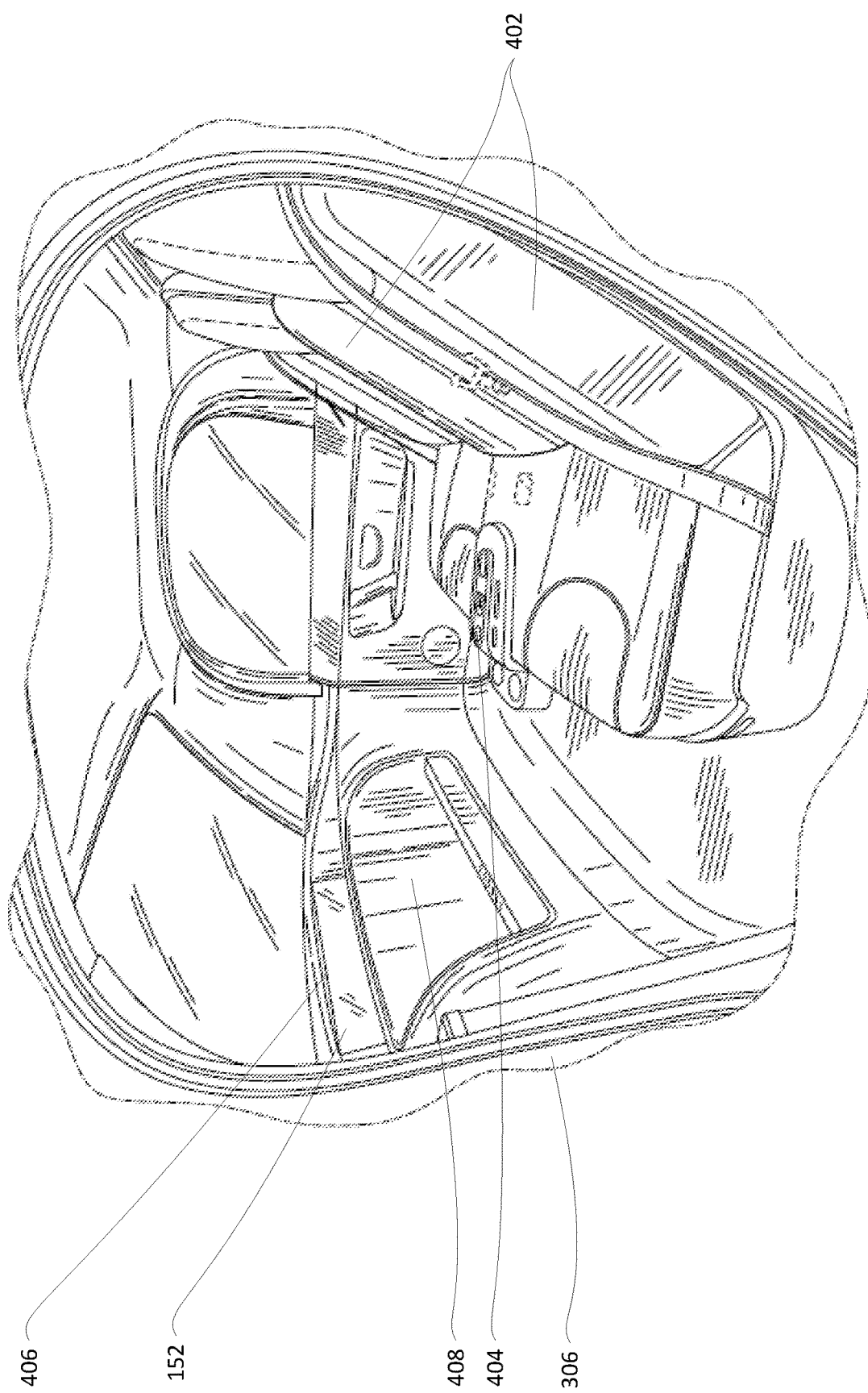
FIG. 4 is an example interval view of a vehicle in accordance with aspects of the disclosure.

FIG. 4 is an example internal view of vehicle 100 through the opening of door 306. In this example, there are two seats 402 for passengers with a console 404 between them. Directly in ahead of the seats 402 is a dashboard configuration 406 having a storage bin area 408 and the internal display 152. As can be readily seen, vehicle 100 does not include a steering wheel, gas (acceleration) pedal, or brake (deceleration) pedal which would allow for a semi-autonomous or manual driving mode where a passenger would directly control the steering, acceleration and/or deceleration of the vehicle via the drivetrain. Rather, user input is limited to a microphone of the user input 150 (not shown), features of the console 404, and wireless network connections 156.

In this regard, internal display 152 merely provides information to the passenger and need not include a touch screen or other interface for user input. In other embodiments, the internal display 152 may include a touch screen or other user input device for entering information by a passenger such as a destination, etc.

The computing device 110 may control the direction and speed of the vehicle by controlling various components. By way of example, computing device 110 may navigate the vehicle to a destination location completely autonomously using data from the detailed map information and navigation system 168. In order to maneuver the vehicle, computing device 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between a power system 174 (for instance, a gas or electric engine) of the vehicle and the wheels of the vehicle. Again, by controlling these systems, computing device 110 may also control the drivetrain of the vehicle in order to maneuver the vehicle autonomously.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

As described above, the video display system 176 may receive information in order to generate a video such as various imagery and scenes as discussed further below. In this regard, as the vehicle carries passengers on a trip to a destination, the vehicle's video display system may monitor system data generated by the other computing devices regarding the vehicle's operation including data generated by the vehicle's navigation system, positioning system, and perception system. For instance, the data received by the video display system 176 may include objects external to the vehicle within a particular range from the vehicle's perception system 172, data from the positioning system 170, such as the vehicle's current location, and data from the navigation system 168, such as the vehicle's projected trajectory and map information.

Figure 5A:
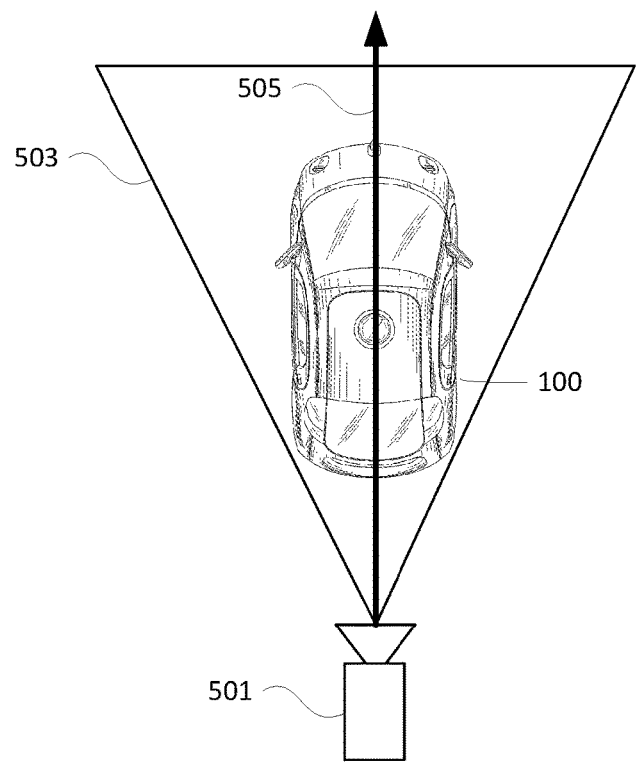
FIGS. 5A and 5B are illustrations of a virtual camera positioned at a default position in accordance with aspects of the disclosure.
Figure 5B:
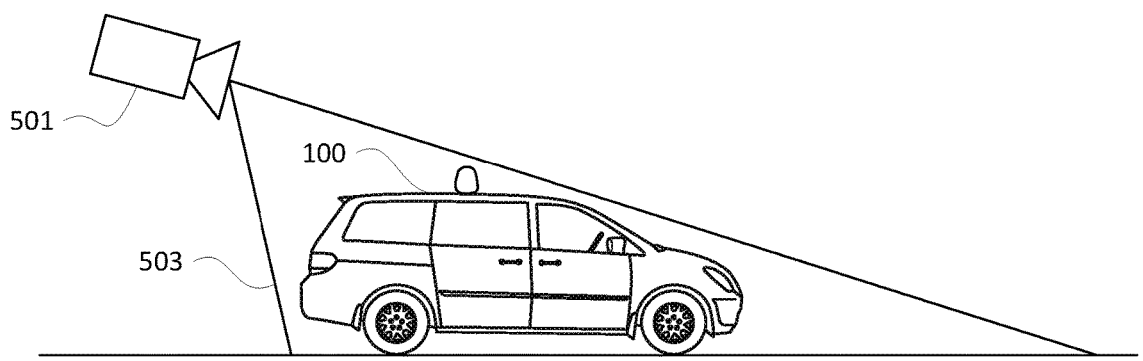

Based on the data received by the video display system, a video may be generated for display on a display in the vehicle for viewing by the vehicle's passengers. The video display system may generate the video as a scene from a perspective of a virtual camera using the received data by overlaying the vehicle's projected trajectory and detected objects on a map corresponding to the route the vehicle is traveling. The perspective of a virtual camera may be fixed relative to the vehicle at a default position. For instance, this default position of the fixed position virtual camera 501 may be above and to the rear of the vehicle 100 and directed in a first heading 505, as shown in FIGS. 5A and 5B. The video may include imagery within a set field of view 503 corresponding to the first heading 505 and position of the fixed position virtual camera 501.

Figure 6:
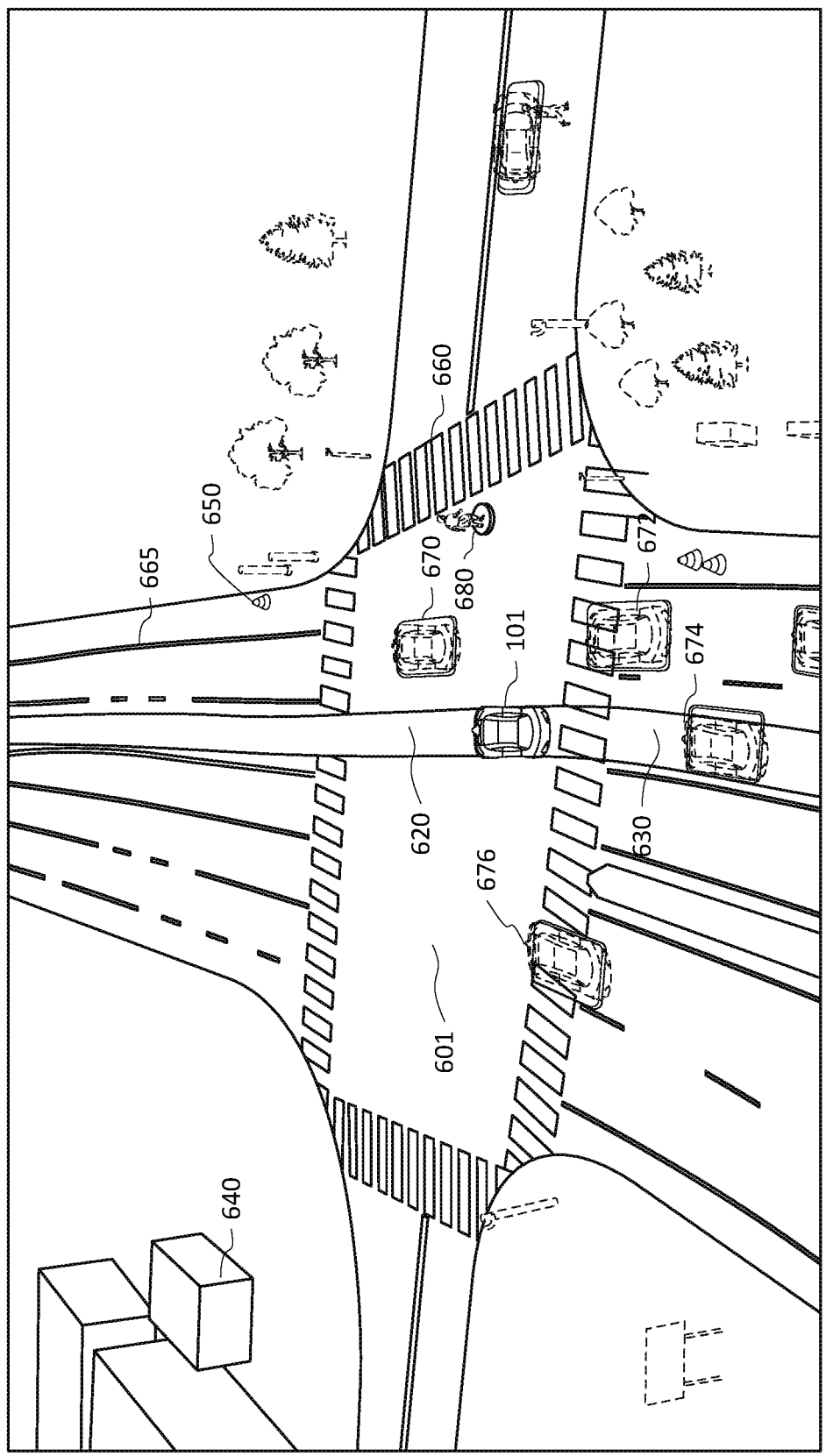
FIG. 6 is an illustration of a video frame showing a field of view of a virtual camera in accordance with aspects of the disclosure.

The video display system may generate the video by overlaying a virtual representation of the vehicle and the vehicle's projected trajectory on a 3D scene of the vehicle's environment. The map may be generated based on data received from the vehicle's navigation system 168 and positioning system 170. For example, FIG. 6 shows a frame 600 of a video generated by the video display system from the perspective of a virtual camera positioned in the default position above and behind the vehicle. The frame 600 includes a map 601 and a virtual representation of the vehicle 100 (virtual vehicle 101) overlaid on the map. The vehicle's projected trajectory 620 and past route 630, received from the positioning system 170 and/or navigation system 168 are also overlaid on the map 601.

The video may also include virtual objects representative of objects stored within map data. For instance, as further shown in FIG. 6, the video includes road lines 665, crosswalk 660, and buildings 640 received from the map data. The position of the virtual vehicle 101 and virtual objects on the 3D scene may be based upon data received from the positioning and navigations systems. The video display system may update the video in substantially real-time by continually updating the vehicle's projected trajectory 620 and location based on received data presented from the perspective of the virtual camera.

Objects identified by the vehicle's perception system may be represented as virtual objects overlaid on the 3D scene. In this regard, the video display system may generate virtual objects which correspond to the data indicating objects provided by the perception system. For instance, the video display system may receive data indicating vehicles and a pedestrian are in within the vicinity of the vehicle, as captured by the perception system 172. Based upon the received data, the video display system may generate and overlay corresponding virtual vehicles 670-676 and pedestrian 680 on the video relative to the position of the virtual vehicle 101, as further shown in FIG. 6.

Each virtual object may be a graphic representation of an object. In this regard, virtual objects may be images, videos, shapes, dot representations, or other such graphics, with each graphic representation being associated with one or more objects. For instance, the video display system 176 may receive notification from the perception system that a vehicle object has been detected. The video display system may of a vehicle object, such as a vehicle may be predefined as being represented by a cuboid virtual object, as further shown in FIG. 6. In another example, pedestrians may be predefined as being represented by a dot representation virtual object, as further shown in FIG. 6.

Dot representations may be based upon data received by the video display system. As previously discussed, the vehicle's video display system 176 may receive data captured by the perception system 172, such as the perception system's LIDAR sensors. In this regard, the LIDAR sensors may rotate at a predefined rate capturing data representative of the vehicle's 100 surroundings. The captured data may be processed in substantially real-time to generate a virtual object comprised of dots representing sensor points (i.e., locations where a sensor detected an object) such as the pedestrian 680.

Generating dot representation virtual objects may include processing the data captured by the perception system to determine sensor points corresponding to where the laser reflected off of objects relative to the vehicle. In this regard, captured data from the perception system may be processed and filtered to remove data which is not required by the video display system. Thus, the filtering may include removing data points corresponding to ground data points (i.e., captured data representative of the ground) as discussed in the example of a mask with incomplete rings, below. The filtering may alternatively or in addition include filtering any other data points not corresponding to moving or static road users such as pedestrians, cyclists, or vehicles (whether or not such other road users are located within a roadway) or details of the road surface such as lane lines or other markers. This may or may not include filtering data points corresponding to debris, vegetation, etc. The remaining data may be processed to determine sensor points and their respective locations relative to the vehicle, based on how far a laser signal travelled at a particular yaw and pitch.

Virtual objects comprised of dots representing the sensor points may also be generated and displayed in the video at the location the sensor points were captured. In this regard, using image processing techniques, groupings of one or more sensor points may be analyzed to determine whether they are of a predefined object, such as a tree, pedestrian, vehicle, cyclist, etc. Upon the video display system determining one or more sensor points correspond to a pedestrian, a dot representation virtual object representing that predefined object may be generated and displayed in the video. For example, one or more sensor points corresponding to a pedestrian may be determined and a dot representation pedestrian virtual object, such as pedestrian 680 in FIG. 6 may be generated and displayed in the video at a location corresponding to the actual location of the object. In instances where the number of sensor points corresponding to a virtual object is large, the video display system may display only a subset of the sensor points to avoid oversaturating the display.

Virtual objects may be selectively displayed in the 3D scene. As previously discussed, passengers may be overwhelmed when too much information is presented on the display. As such, the video display system may select only a subset of objects provided by the perception system 172 from which to generate and continually display corresponding virtual objects. The subset of objects for which virtual objects may be generated and displayed may be based upon the types of objects which the virtual objects represent. For instance, objects of interest to passengers, such as objects which may affect the operation of the vehicle, objects which provide context as to the vehicle's location, or other such objects may be generated and displayed. In one example, the video display system may generate and display virtual objects which correspond to road lines 665, crosswalks 660, surrounding vehicles 670-676, traffic cones 650, nearby pedestrians 680, and nearby buildings 640, as further shown in FIG. 6. Other nearby objects, such as trees, street signs, etc., may not be displayed on the 3D scene.

Upon an object no longer being in the vicinity of the vehicle, its corresponding virtual object may no longer be displayed. In this regard, the video display system may move the virtual object off of the 3D scene or cease generating the virtual object. For instance, as the vehicle moves past building 640, the video may move the building 640 off of the display.

Figure 7:
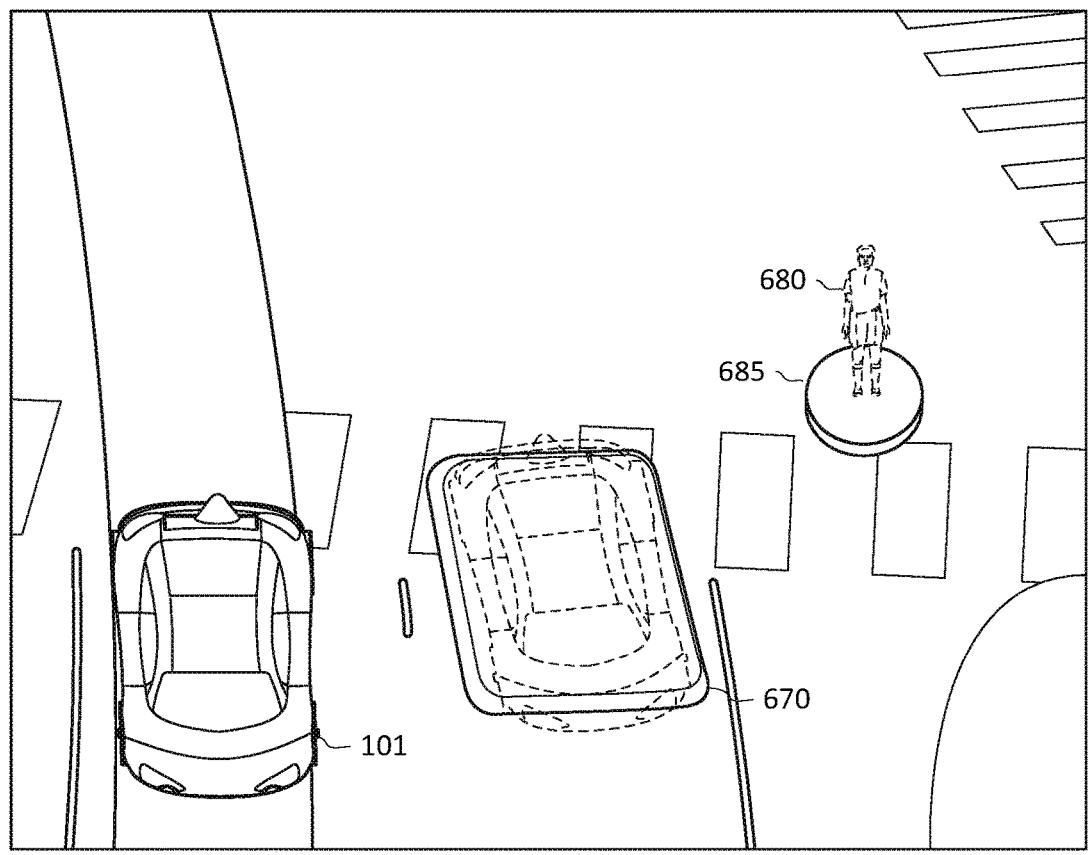
FIG. 7 is a close-up illustration of a portion of a video frame showing a pedestrian in accordance with aspects of the disclosure.

In some instances, the video display system may illuminate or highlight virtual objects. In this regard, virtual objects which represent objects of interest be illuminated highlighted with a solid or flashing base, increasing the brightness of all or a portion of the virtual object, or other such visual element which brings attention to the virtual object. As described herein, objects of interest may be those objects of interest to passengers, such as objects which may affect the operation of the vehicle, objects which provide context as to the vehicle's location, or other such objects. For example, pedestrian 680 may be represented as a virtual object on a base 685 (which may be flashing or solid) as shown in example 700 of FIG. 7.

As previously discussed, providing too little imagery of the vehicle's surroundings may cause the passengers discomfort, as they may not believe the vehicle is aware of all of its surroundings. To address this, the video display system may emulate the operation of a sensor in the perception system, such as a LIDAR, to provide additional details of the vehicle's surroundings on the display. Emulation of the sensor may include generating a mask on the display which illuminates sensor points associated with some or all of the objects identified by the perception system. In this regard, dot representation virtual objects may be generated and displayed for some, or all, of the objects which were not selected as part of the subset of objects for continual display.

Figure 8A:
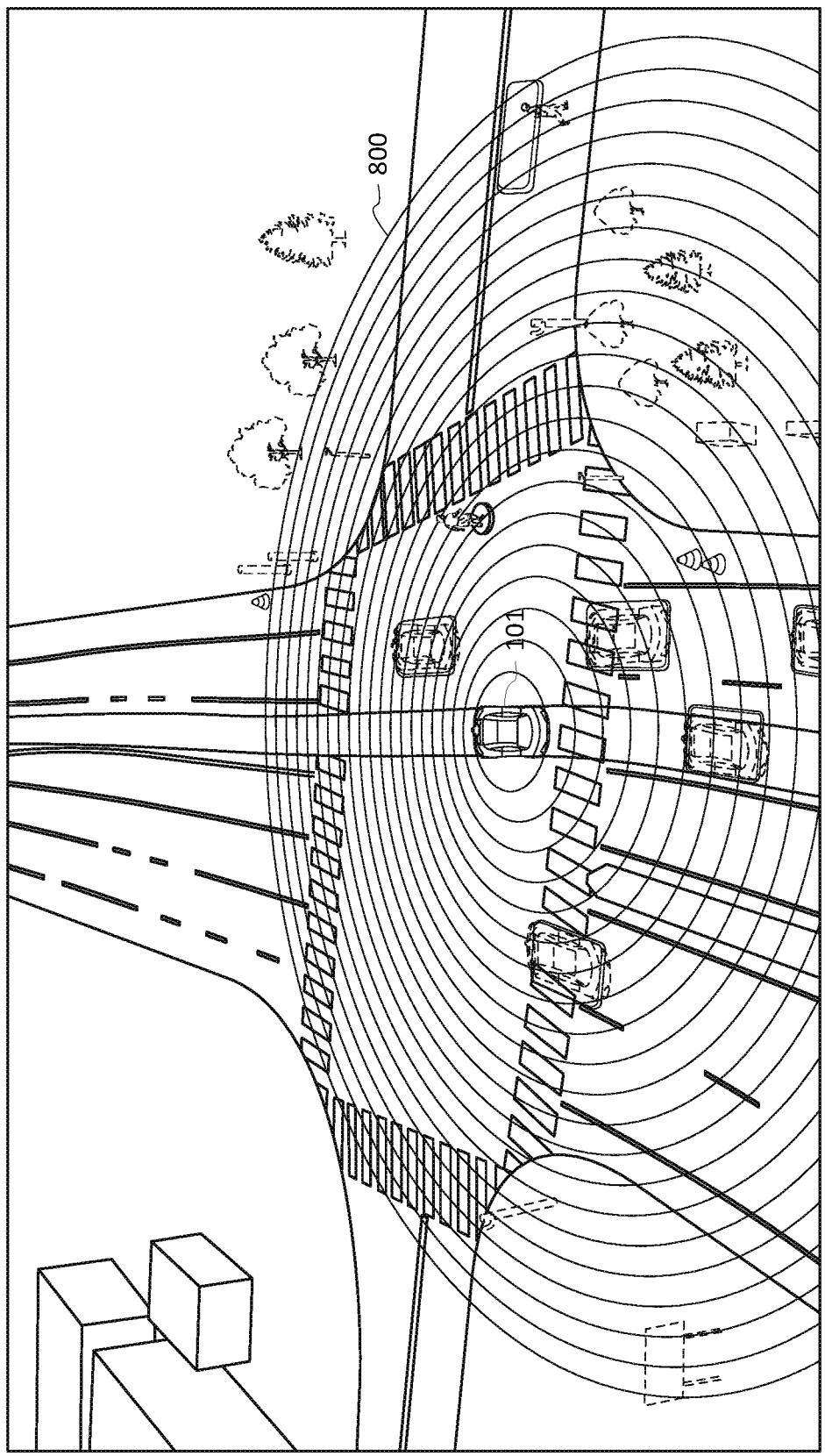
FIGS. 8A-8F are example illustrations of video frames in accordance with aspects of the disclosure.
Figure 8B:
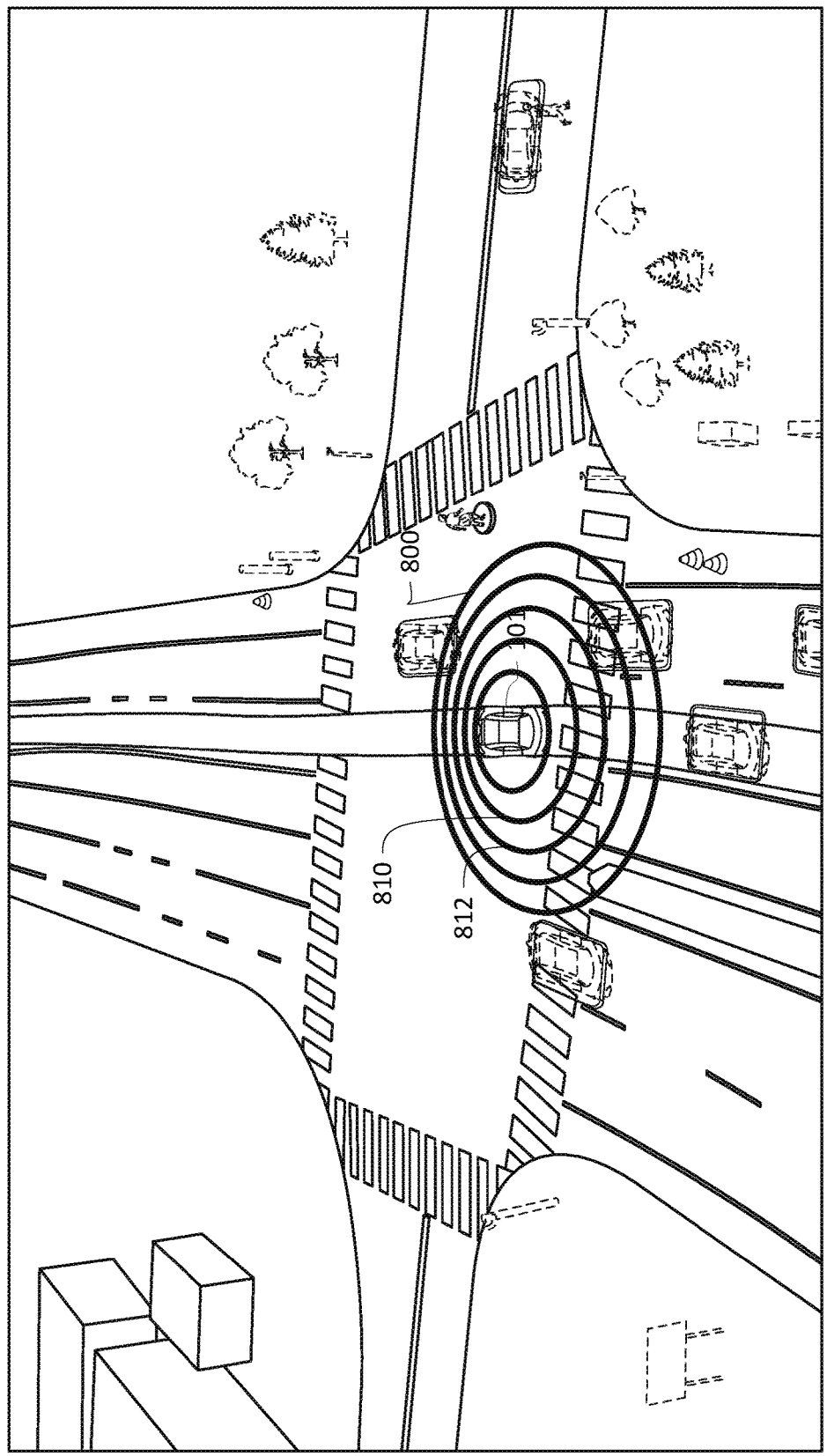
Figure 8C:
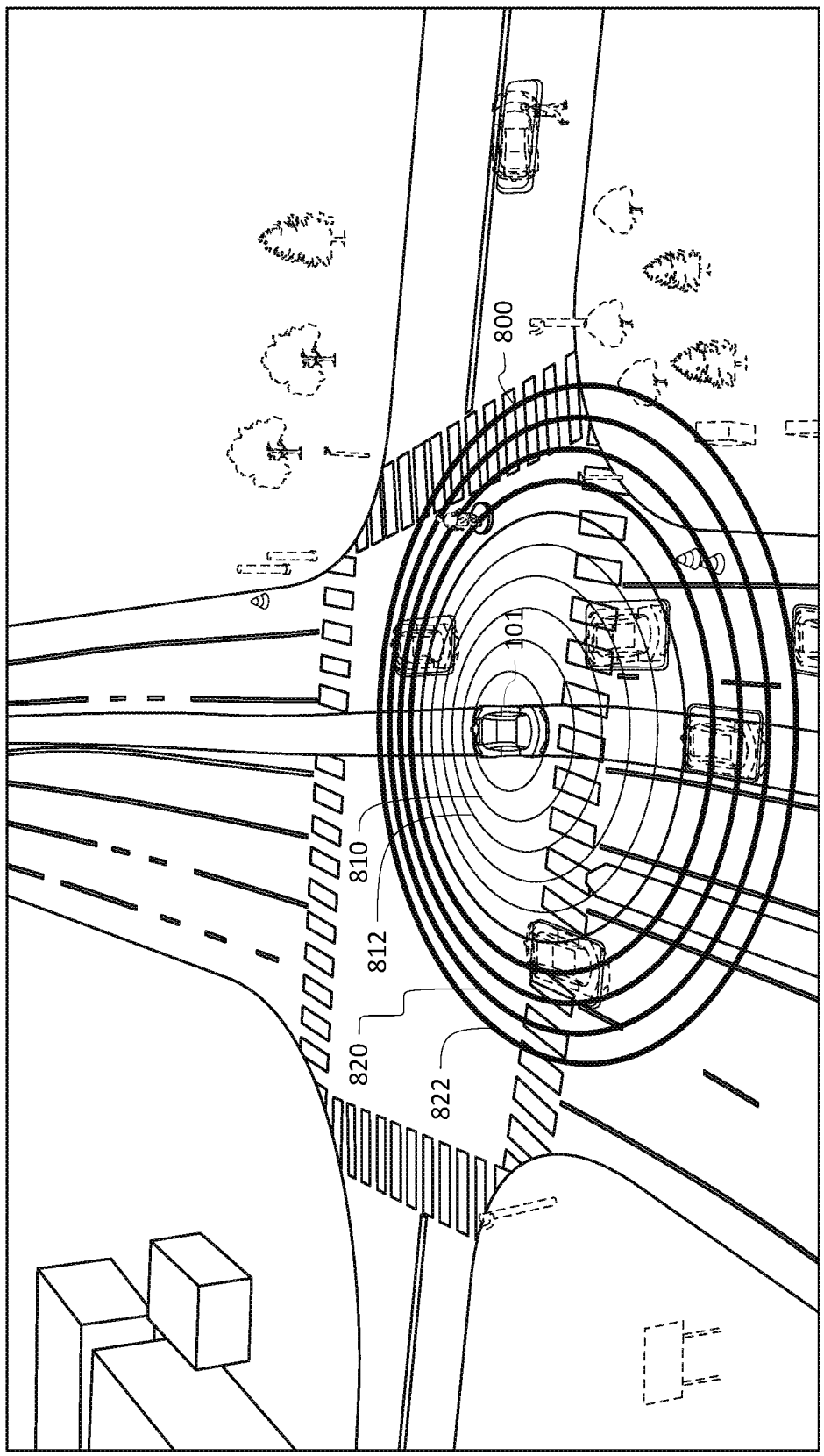
Figure 8D:
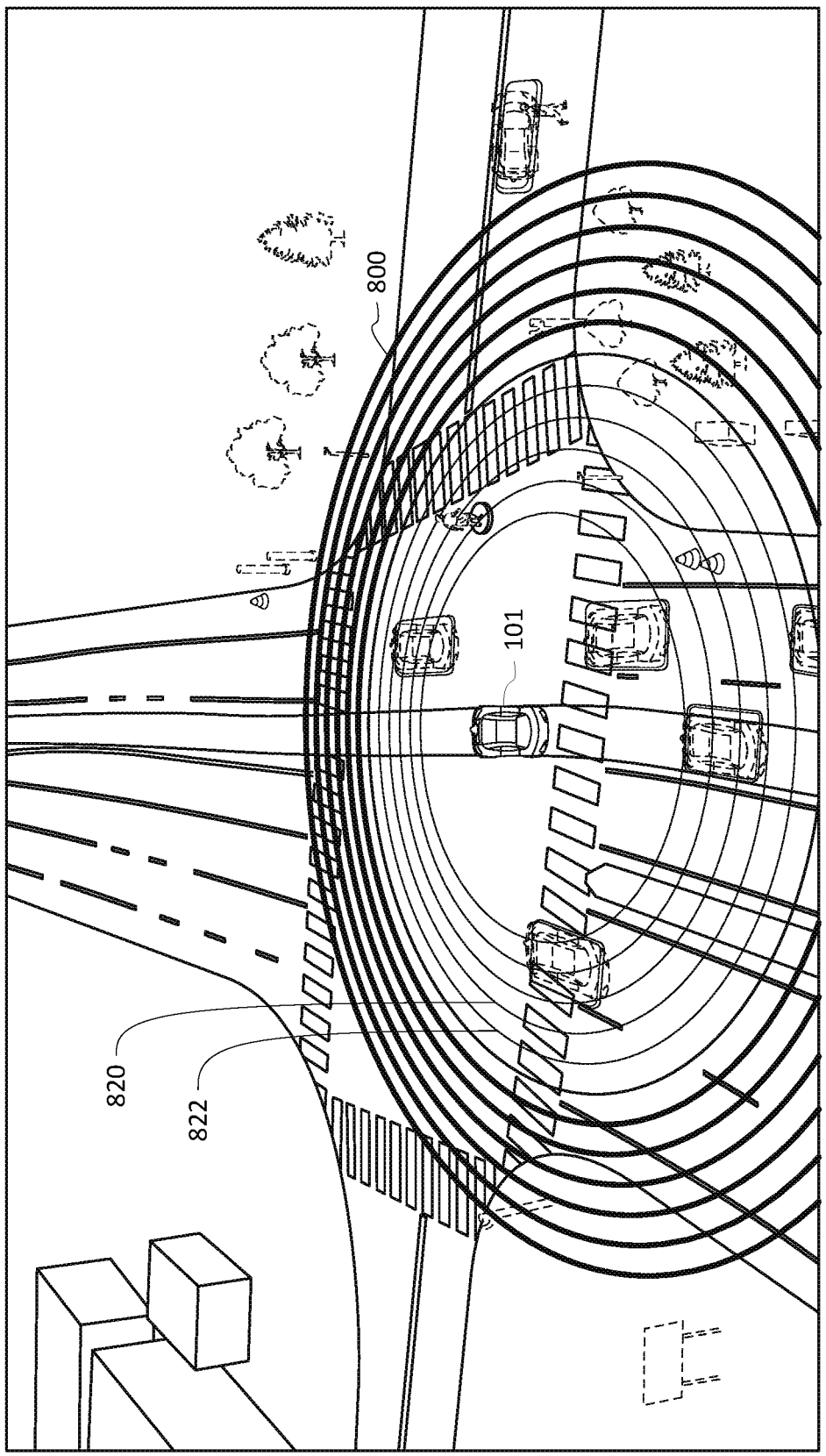
Figure 8E:
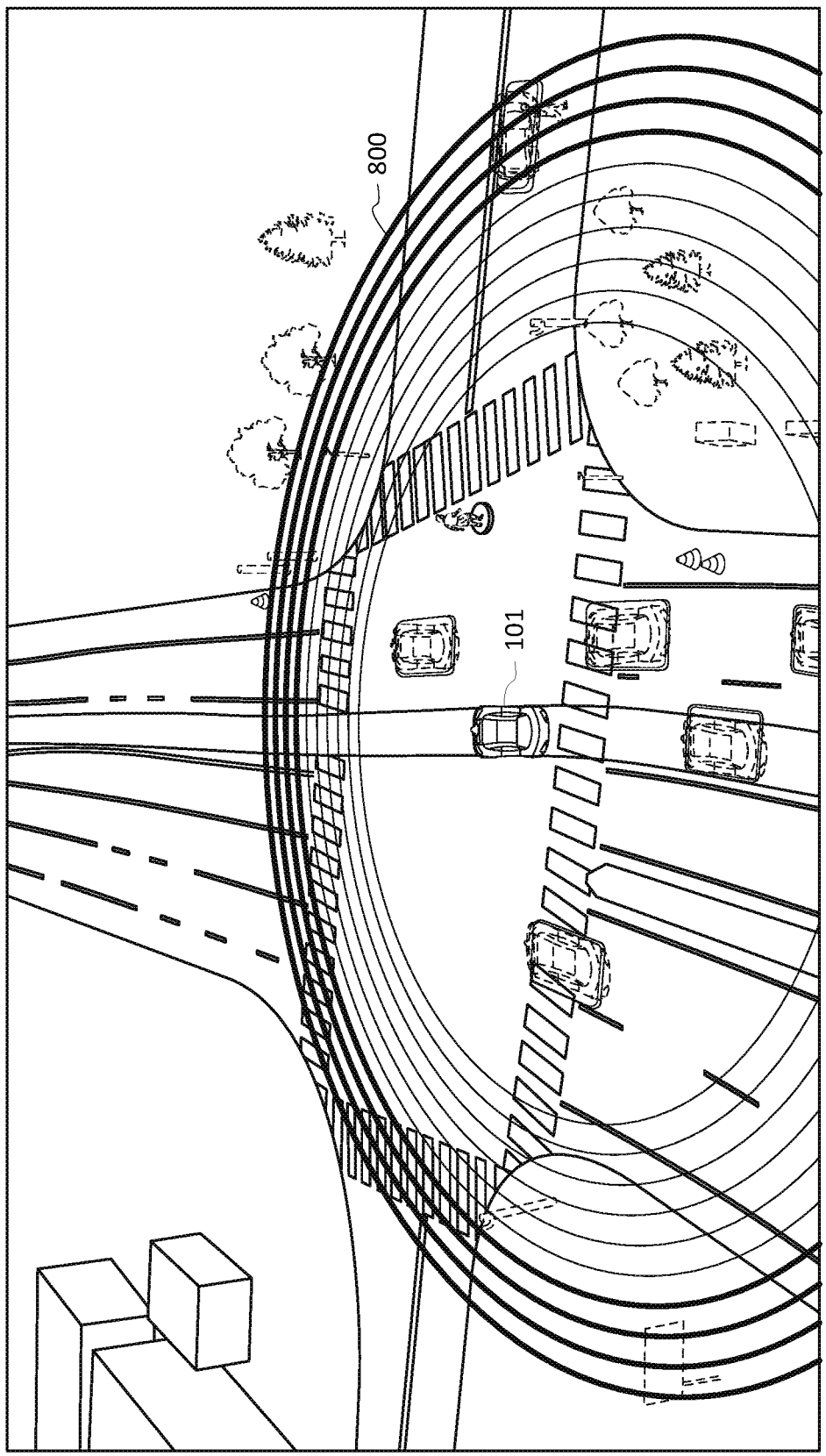
Figure 8F:
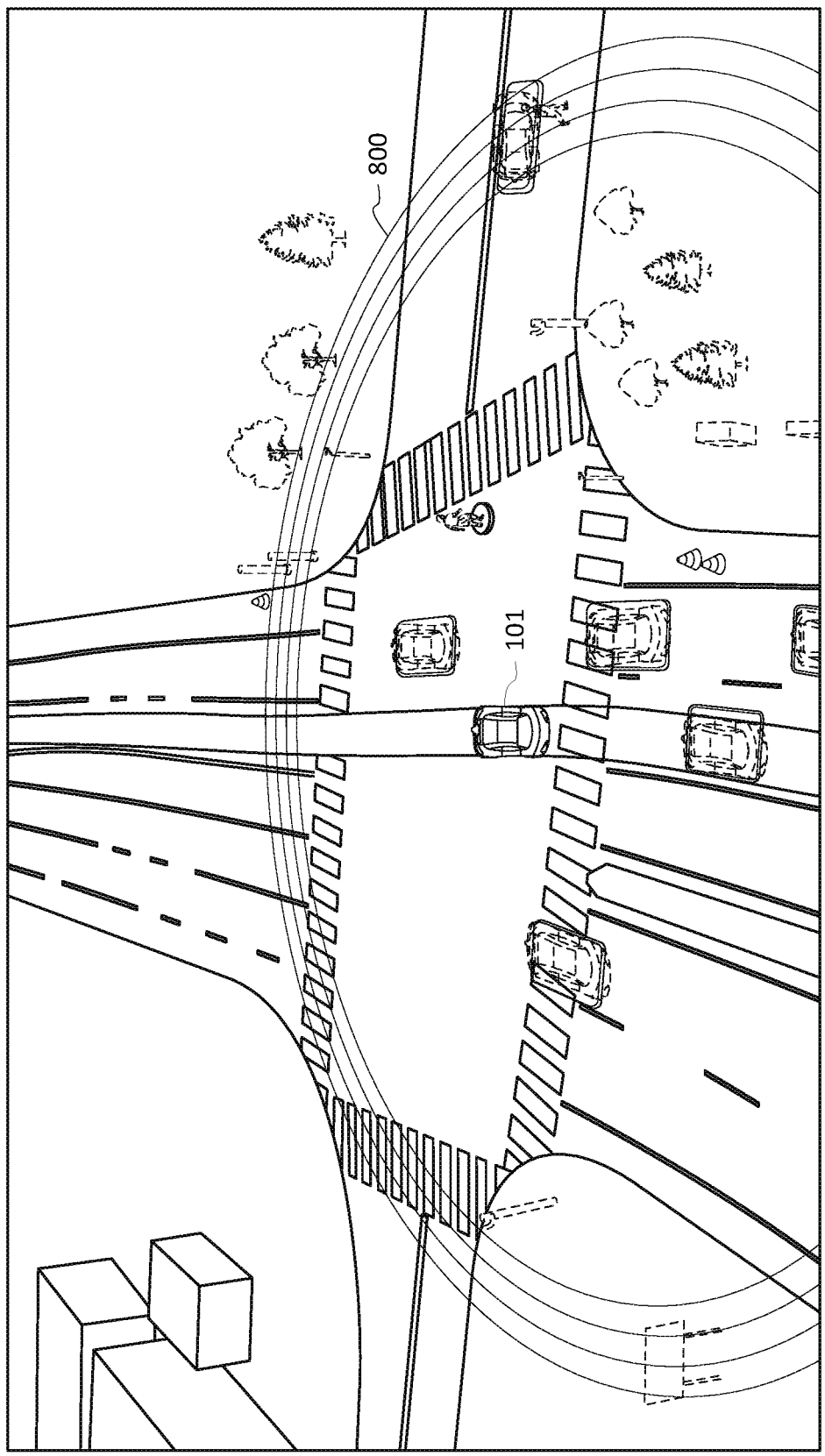

The mask may be an animation which gives the passenger the impression that a sensor, such as a LIDAR sensor, is capturing data. Although the examples below relate to a pulse including a plurality of rings, a mask may be represented as a single ring, part of a ring, or any other shape. FIG. 8A depicts an example frame 801 showing all of the rings of a single pulse 800. After the pulse is completed, the rings may disappear as shown in frame 600 of FIG. 6. To increase the impression that the pulse 800 corresponds to the sensor detecting information, the rings of the pulse 800 may be displayed as an "animation" such that the pulse appears to starting from and emanating away from the virtual vehicle 101. For instance, frames 802-806 of FIGS. 8B-8F provide a simplified example of this animation where in frame 802 of FIG. 8B the rings closest to the vehicle, such as rings 810 and 812, appear first and then disappear. Rings farther from the vehicle, such as rings 820 and 822, appear and later disappear as shown in frames 803-804 of FIGS. 8C and 8D, respectively. When the last rings disappear, the 3D scene would be as shown in frame 600 of FIG. 6.

The rings may initially be very bright and fade away over time. Alternatively, the rings may be somewhat dull and increase in brightness to a maximum brightness as shown between frames 802 and 803 of FIGS. 8B to 8C, and thereafter fade away over a period of time, such as 5 seconds or more or less. In addition, the positions of the rings themselves may also be fixed relative to the vehicle. That is, as the vehicle moves, the rings "move" with the vehicle as they are fading in and out of the 3D scene. For reference, the examples of FIGS. 8B-8F depict vehicle 100 as stationary over the course of the pulse 800 for simplicity.

As the rings expand and move away from the vehicle, they may illuminate sensor points on some, or all of the virtual objects identified by the perception system, but not included as part of the subset of selected objects, such as trees, street signs, etc. For instance, when a ring which overlaps with a virtual object appears, the virtual object may be illuminated or highlighted as in the examples of the virtual road lines 665, crosswalks 660, surrounding vehicles 670-676, traffic cones 650, nearby pedestrians 680, and buildings 640 (labeled in FIG. 6 but also included in frames 801-806 of FIGS. 8A-8F). Alternatively, the rings may cause the virtual objects to "appear" in the 3D scene such that when a ring which overlaps with a virtual object appears, the virtual object may appear initially either at a maximum brightness or increase to the maximum brightness. In yet another alternative, where the ground points are filtered from the captured data as discussed above, on that portion of the rings that "intersects" with one of the virtual objects may be displayed. In that regard, rather than complete rings, the mask may be displayed as discrete portions of rings corresponding to the areas of rings that intersect with the virtual objects. Thus, if there were no virtual objects other than the vehicle in the display, there would be no rings or portions of rings in the mask. Again, after some predetermined pulse period, such as 5 seconds or more or less, the rings may fade and disappear. As the ring fades, so may the illuminating or highlighting of the virtual object, and in some instances, the virtual object may also fade and disappear.

Although the above example describes the mask as being a pulse animated by having rings emanating from the vehicle, other types of display changes may be used to indicate a pulse has occurred, such as a dimming and subsequent brightening of all or portions of the display corresponding to the rings, etc.

The video display system may generate and display supplemental points for the virtual objects corresponding to objects stored within map data, such as buildings, lane markers, signs, and other structures. These supplemental points may be simulated data points generated by the computing devices 110, as discussed further below, rather than points corresponding to actual data captured by sensors in the perception system 172. In this regard, during a mask (or as in the examples above, a pulse), the video display system may generate supplemental points which may be overlaid onto one or more surfaces of virtual objects corresponding to objects stored within map data, thereby creating the illusion that a sensor, such as the LIDAR, is capturing data related to the objects stored in the map data corresponding to the supplemental points.

Figure 9A:
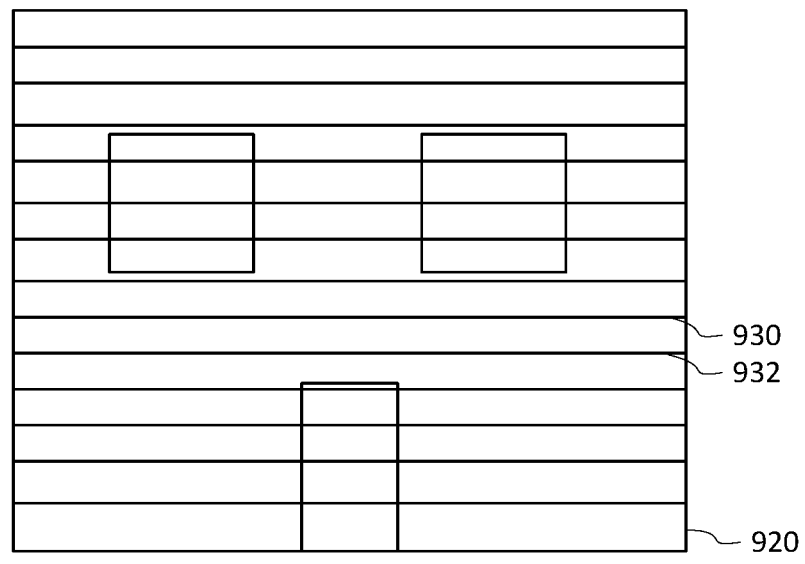
FIG. 9A is an illustration of a one-dimensional grid applied to a building in accordance with aspects of the disclosure.
Figure 9A:
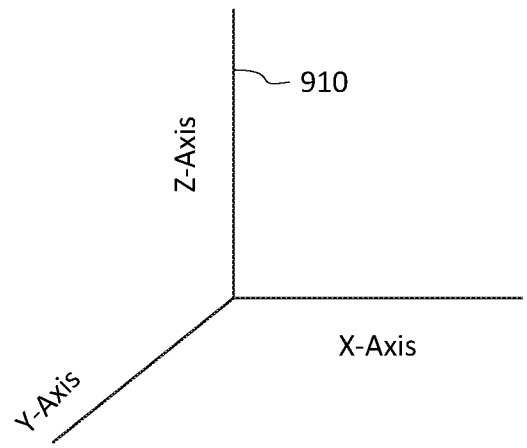

The surfaces of the virtual objects associated with the objects stored within the map data may include a one-dimensional or two-dimensional grid of sensor areas. The spacing between the lines of both the one and two-dimensional grids may be evenly spaced, such as every meter, or more or less, or variable such that the distance between the lines is not the same. In this regard, one-dimensional grid may be defined by parallel lines placed on a single axis, as shown in FIG. 9A. For instance, coordinate system 910 may be mapped to the surface of building 920 shown in FIG. 9A. Parallel lines 930 and 932 may correspond to the x-axis of coordinate system 910 relative to the surface of building 920.

Figure 9B:
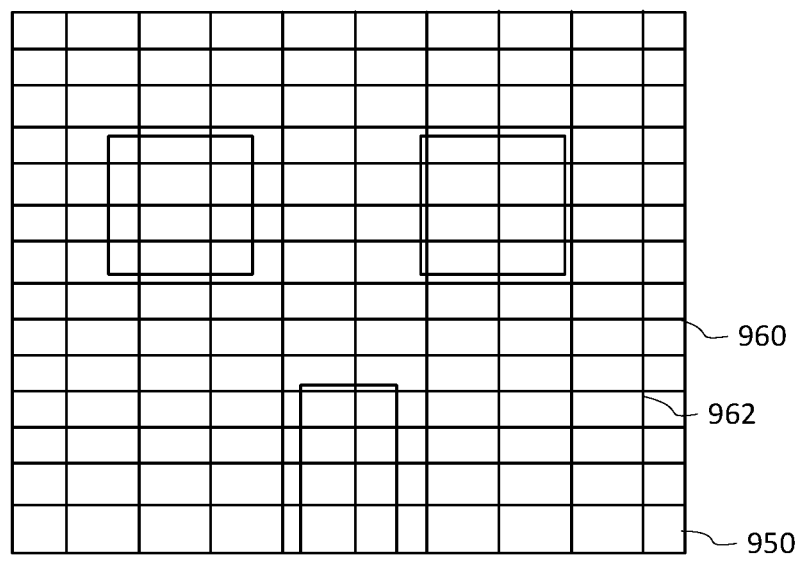
FIG. 9B is an illustration of a two-dimensional grid applied to a building in accordance with aspects of the disclosure.
Figure 9B:
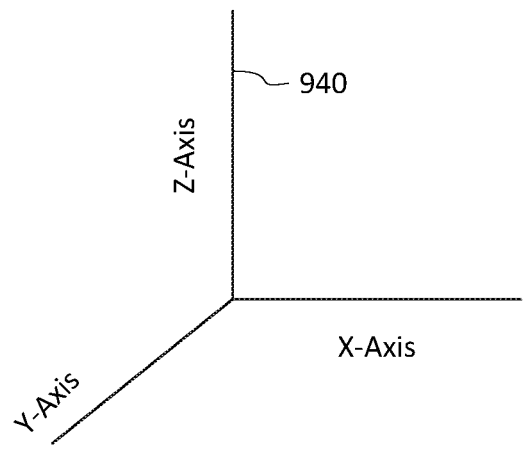

Any two-dimensional grid may be defined by lines placed on two perpendicular axes, as shown in FIG. 9B. For instance, coordinate system 940 may be mapped to the surface of building 950 shown in FIG. 9A. Grid lines 960 and 962, which intersect perpendicularly, may correspond to the x-axis of coordinate system 910 relative to the surface of building 950.

Figure 10:
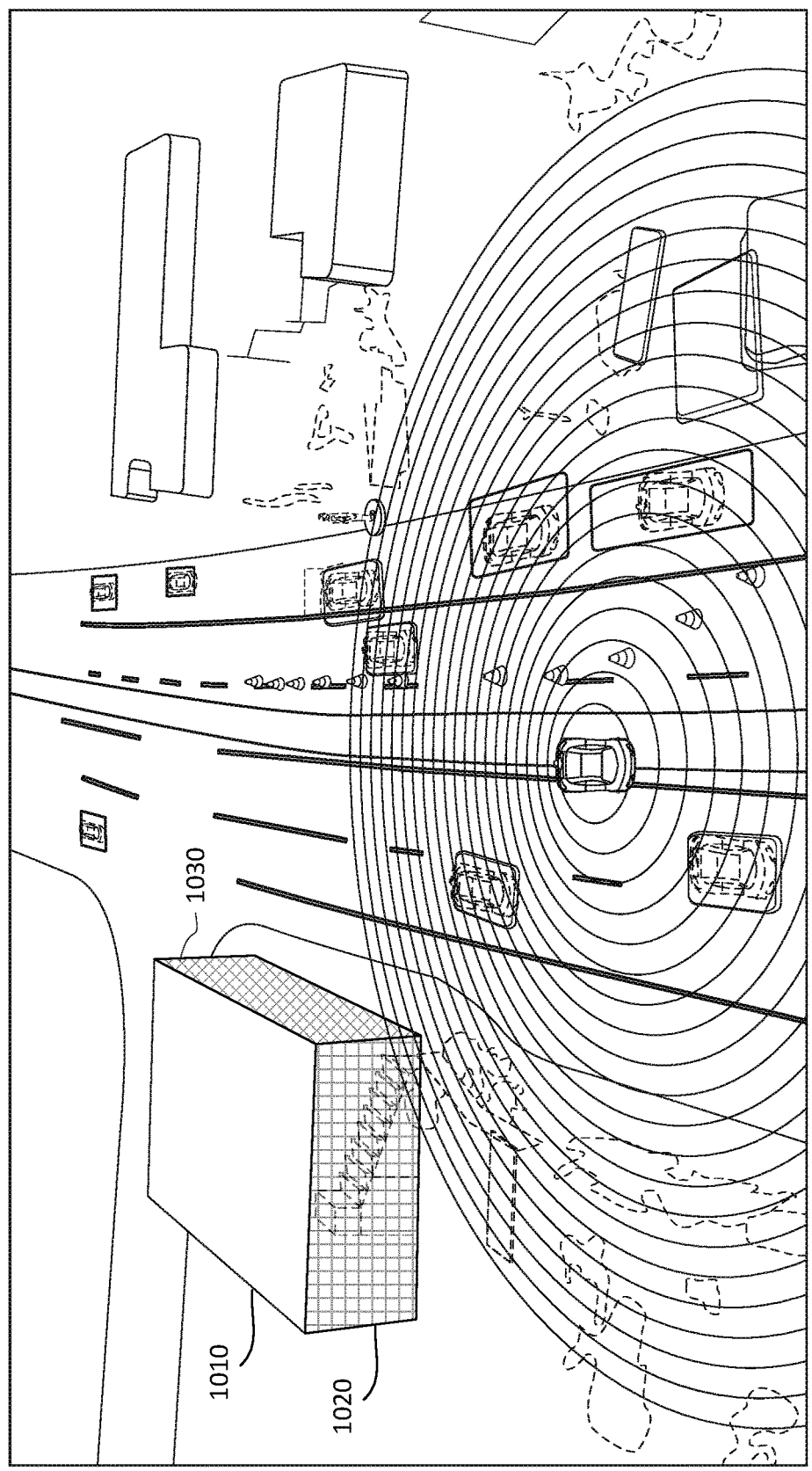
FIG. 10 is an illustration of video frame showing an illuminated two-dimensional grid applied to a building in accordance with aspects of the disclosure.

The lines of the one-dimensional grids and the intersection points of the two-dimensional grids may be illuminated as supplemental points. For instance, crosswalks and buildings may be defined as a two-dimensional grid. Upon a mask being generated by the virtual display system, dot based supplemental points may be added to the 3D scene as shown in FIG. 10. In the example of frame 1000 of FIG. 10, building 1010 includes grids 1020 and 1030 corresponding to supplemental points. Other road markings, such as street lines, may use a one-dimensional grid where the entire line may be illuminated during a mask. In some instances the one-dimensional grid lines of certain virtual objects, such as street lines, may be positioned perpendicular to the direction of the virtual object. As such, the illuminated lines may be thin and appear as dots.

In one example, the two-dimensional grid may be defined in the coordinate space of a virtual object's surface, such as a building, pedestrian, bicyclist, vehicle, ground surface etc. As an example, a crosswalk or a building surface may have 2 axes defined by a position of a point along the perimeter and height of the point off the ground. If the distance between cells or steps on the grid is 0.25 meters, the sides of a building may appear to be wrapped in in a grid-like texture as shown in FIG. 9B with 0.25 meter spacing. As the mask, or rings of the pulse, intersect with the building surface, all nearby grid cells (or the supplemental points) may be illuminated or highlighted as shown on building 1010 of FIG. 10, or alternatively, only the intersections of the lines of the grid may be illuminated or highlighted (i.e. not all of the lines).

As another example, ground surfaces, for instance areas of the roadway and beyond, for the scene may be generated using elevation data stored in the map information. All or some of these areas (such as only the roadway, only beyond the roadway, or both), may then be filled with supplemental points using a fixed two-dimensional grid with points, intersections, and/or cells highlighted as discussed in the examples above. In addition, grid lines of the the fixed two-dimensional grid may run in the cardinal directions, such as East and West as well as North and South. Alternatively, a grid oriented in a direction different from the cardinal directions may be used. Other thin objects, such as line type road markings (e.g. lane lines) may have a one-dimensional grid which essentially corresponds to distance along the road marking as in the example of FIG. 9A.

The video display system may also augment virtual objects with supplemental points to provide additional visual details to the passengers. In this regard, objects which are provided by the map data and which are captured by a vehicle's sensor may be displayed on the 3D display as virtual objects comprised of images, videos, shapes, dot representations, or other such graphics. Upon a mask being generated, supplemental points based on a 1D or 2D grid received from map data may also be illuminated, thereby providing simulated details to the virtual object which were not provided by the perception system 172.

In addition to highlighting virtual objects based on whether the pulse contacts that object in the video, other types of objects may be highlighted to demonstrate their importance. For instance, a representation of a crosswalk may be highlighted if a pedestrian (or a virtual object corresponding to a pedestrian) is in the crosswalk. Thus, when the pedestrian leaves the crosswalk, the representation of the crosswalk may no longer be highlighted.

Although the examples above relate to displaying a mask as a pulse (or portions of a pulse) overlaid onto a 3D scene, alternatively, the mask may be displayed over a live camera view of the vehicle's environment generated from image frames of one or more still or video cameras. In addition, a trajectory of the vehicle corresponding to a route the vehicle is currently following and the route the vehicle previously travelled may also be overlaid onto the live camera view. In this example, when rings of a pulse intersect with an actual object displayed in the live camera view, supplemental points, and in some cases actual data points from the perception system 172 may be highlighted or displayed as in the examples discussed above in order to give the impression that all of the data points were generated by the perception system 172.

Figure 11:
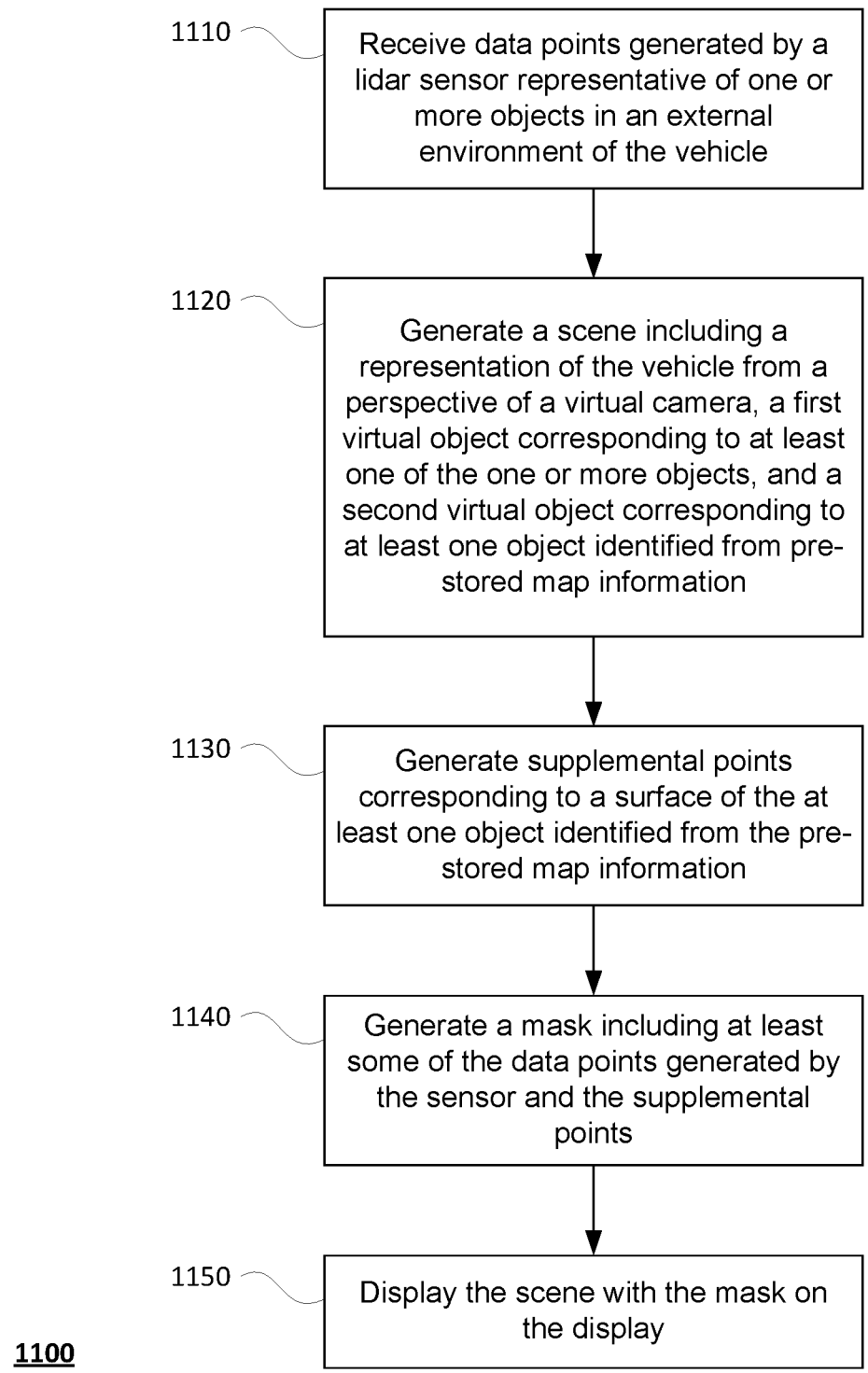
FIG. 11 is an example flow diagram in accordance with aspects of the disclosure.

FIG. 11 is an example flow diagram 1100 which may be performed by one or more processors of one or more computing devices of a vehicle, such as processors 120 of computing devices 110 of vehicle 100 in order to provide sensor data on a display of a vehicle, such as internal display 152 of vehicle 100. At block 1110, data points generated by a lidar sensor are received. The data points may be representative of one or more objects in an external environment of the vehicle. At block 1120, a scene including a representation of the vehicle from a perspective of a virtual camera, a first virtual object corresponding to at least one of the one or more objects, and a second virtual object corresponding to at least one object identified from pre-stored map information is generated. At block 1130, supplemental points corresponding to a surface of the at least one object identified from the pre-stored map information are generated. At block 1140, a mask including at least some of the data points generated by the sensor and the supplemental points is generated. At block 1150, the scene is displayed with the mask on the display.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of providing sensor data on a display of a vehicle, the method comprising:
   receiving, by the one or more processors, data points generated by a lidar sensor representative of one or more objects in an external environment of the vehicle;
   generating, by the one or more processors, a scene including a representation of the vehicle from a perspective of a virtual camera, a first virtual object corresponding to at least one of the one or more objects, and a second virtual object corresponding to at least one object identified from pre-stored map information;
   generating, by the one or more processors, supplemental points corresponding to a surface of the at least one object identified from the pre-stored map information;
   generating, by the one or more processors, a mask including at least some of the data points generated by the sensor and the supplemental points, and a plurality of rings; and
   displaying, by the one or more processors, the scene with the mask on the display, wherein displaying the mask includes highlighting the at least some the supplemental points once a ring of the plurality of rings contacts a surface of the second virtual object.

2. The method of claim 1, wherein the supplemental points are not points corresponding to actual sensor data provided by a perception system of the vehicle including the lidar sensor.

3. The method of claim 1, wherein the plurality of rings are concentric about the vehicle from a top-down perspective.

4. The system of claim 3, wherein the plurality of rings are concentric about the vehicle from a top-down perspective.

5. The method of claim 1, wherein displaying the mask includes displaying the plurality of rings such that the rings appear to emanate from the vehicle.

6. The method of claim 1, wherein displaying the mask includes displaying portions of the plurality of rings only when such portions contact the first virtual object.

7. The method of claim 1, wherein displaying the video includes fading the plurality of rings away over a period of time.

8. The method of claim 1, wherein the first virtual object is a road user.

9. The method of claim 1, wherein the at least one object is a building.

10. The method of claim 1, wherein the at least one object is a lane marker.

11. The method of claim 1, wherein generating the supplemental points includes generating one or more lines for a surface of the second virtual object.

12. The method of claim 1, wherein generating the supplemental points includes identifying intersection points of two or more sets of perpendicular lines overlaid on a surface of the second virtual object.

13. The method of claim 1, wherein generating the supplemental points includes identifying points of a grid overlaid on a surface of the second virtual object.

14. A system of providing sensor data on a display of a vehicle, the system comprising one or more processors configured to:
   receive data points generated by a lidar sensor representative of one or more objects in an external environment of the vehicle;
   generate a scene including a representation of the vehicle from a perspective of a virtual camera, a first virtual object corresponding to at least one of the one or more objects, and a second virtual object corresponding to at least one object identified from pre-stored map information;
   generate supplemental points corresponding to a surface of the at least one object identified from the pre-stored map information;
   generate a mask including at least some of the data points generated by the sensor and the supplemental points, and a plurality of rings; and
   display the scene with the mask on the display, wherein displaying the mask includes highlighting the at least some the supplemental points once a ring of the plurality of rings contacts a surface of the second virtual object.

15. The system of claim 14, wherein the simulated points are not points corresponding to actual sensor data provided by a perception system of the vehicle, including the lidar sensor.

16. The system of claim 14, further comprising the vehicle.

* * * * *